US011035195B2

(12) United States Patent
Meeks et al.

(10) Patent No.: US 11,035,195 B2
(45) Date of Patent: Jun. 15, 2021

(54) METHODS OF MITIGATING LOST CIRCULATION WHILE DRILLING A WELLBORE

(71) Applicants: Bill R. Meeks, The Woodlands, TX (US); Timothy J. Nedwed, Houston, TX (US); Douglas A. Mitchell, Spring, TX (US); Rachna Jain, Collierville, TN (US); Kaustubh S. Kulkarni, The Woodlands, TX (US)

(72) Inventors: Bill R. Meeks, The Woodlands, TX (US); Timothy J. Nedwed, Houston, TX (US); Douglas A. Mitchell, Spring, TX (US); Rachna Jain, Collierville, TN (US); Kaustubh S. Kulkarni, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 162 days.

(21) Appl. No.: 16/189,586

(22) Filed: Nov. 13, 2018

(65) Prior Publication Data
US 2019/0186231 A1  Jun. 20, 2019

Related U.S. Application Data

(60) Provisional application No. 62/608,224, filed on Dec. 20, 2017.

(51) Int. Cl.
*E21B 33/12* (2006.01)
*E21B 21/00* (2006.01)
(Continued)

(52) U.S. Cl.
CPC .......... *E21B 33/1208* (2013.01); *C09K 8/426* (2013.01); *C09K 8/44* (2013.01);
(Continued)

(58) Field of Classification Search
CPC .. E21B 33/1208; E21B 21/003; E21B 33/138; E21B 33/10; E21B 33/134; C09K 8/44; C09K 8/426
See application file for complete search history.

(56) References Cited

U.S. PATENT DOCUMENTS 3,223,162 A * 12/1965 Burge .................. C09K 8/5083
166/295
4,495,999 A   1/1985 Sykora
(Continued)

OTHER PUBLICATIONS

Bielawski et al. (2007) "*Living ring-opening metathesis polymerization*", Progress in Polymer Science, vol. 31, No. 1, pp. 1-29.
(Continued)

*Primary Examiner* — Michael R Wills, III
(74) *Attorney, Agent, or Firm* — ExxonMobil Upstream Research Company - Law Department

(57) ABSTRACT

Methods of mitigating lost circulation while drilling a wellbore. The methods include circulating a drilling mud to a downhole end of the wellbore via a drill string and, during the circulating, drilling the wellbore with a drill bit of the drill string. The methods also include detecting lost circulation within the wellbore while drilling the wellbore and include providing a monomer solution to the wellbore. The methods further include providing a catalyst to the wellbore responsive to detecting the lost circulation event and combining the monomer solution and the catalyst to polymerize a monomer from the monomer solution, within the wellbore, and forming a viscous plug within the wellbore. Subsequent to the combining, the methods include flowing at least a portion of the viscous plug within the wellbore and into a zone of lost circulation that extends within a subsurface region. The methods further include at least partially occluding fluid flow from the wellbore and into the zone of lost circulation with the viscous plug.

20 Claims, 4 Drawing Sheets

(51) Int. Cl.
*E21B 33/138* (2006.01)
*E21B 33/10* (2006.01)
*C09K 8/44* (2006.01)
*C09K 8/42* (2006.01)
*E21B 33/134* (2006.01)

(52) U.S. Cl.
CPC ............ *E21B 21/003* (2013.01); *E21B 33/10* (2013.01); *E21B 33/134* (2013.01); *E21B 33/138* (2013.01)

(56) References Cited

U.S. PATENT DOCUMENTS

| | | | |
|---|---|---|---|
| 4,760,882 A * | 8/1988 | Novak | C09K 8/24 |
| | | | 166/295 |
| 5,919,739 A | 7/1999 | Sunde et al. | |
| 6,179,057 B1 | 1/2001 | Fontana et al. | |
| 6,253,854 B1 | 7/2001 | Fenton | |
| 6,932,158 B2 | 8/2005 | Burts, III | |
| 7,544,641 B2 | 6/2009 | Robertson et al. | |
| 8,215,393 B2 * | 7/2012 | MacKay | C09K 8/56 |
| | | | 166/276 |
| 9,518,210 B2 * | 12/2016 | Ezell | C09K 8/5045 |
| 2008/0220991 A1 | 9/2008 | Slay et al. | |
| 2016/0138351 A1 * | 5/2016 | Dillard | E21B 33/128 |
| | | | 175/25 |
| 2016/0264842 A1 * | 9/2016 | Miller | C09K 8/467 |
| 2017/0081933 A1 * | 3/2017 | Nedwed | E21B 33/064 |
| 2018/0237680 A1 * | 8/2018 | Hall | C09K 8/035 |
| 2018/0320475 A1 * | 11/2018 | Payne | E21B 43/04 |

OTHER PUBLICATIONS

Grubbs, R. H. (2006) "Olefin-Metathesis Catalysts for the Preparation of Molecules and Materials (Nobel Lecture)", Metathesis Reactions, *Angew. Chem. Int. Ed.*, 45, pp. 3760-3765.

Nedwed et al. (2017) "Advanced Well Control using Rapid Cross-Linking Polymers", SPE-187318-MS, Society of Petroleum Engineers, 10 pgs.

Nguyen et al. (1992) "Ring-Opening Metathesis Polymerization (ROMP) of Norbornene by a Group VIII Carbene Complex in Protic Media", J. Am. Chem. Soc., 1992, vol. 114, No. 10, pp. 3974-3975.

* cited by examiner

METHODS OF MITIGATING LOST CIRCULATION WHILE DRILLING A WELLBORE

CROSS REFERENCE TO RELATED APPLICATIONS

This application claims the benefit of U.S. Provisional Application Ser. No. 62/608,224, filed Dec. 20, 2017, the disclosure of which is incorporated herein by reference in its entirety.

FIELD OF THE DISCLOSURE

The present disclosure relates generally to methods of mitigating lost circulation while drilling a wellbore and more particularly to methods that include formation of a viscous plug within the wellbore.

BACKGROUND OF THE DISCLOSURE

Lost circulation, which also may be referred to herein as a lost circulation event, may occur when drilling a wellbore within a subterranean formation. More specifically, while drilling the wellbore, drilling mud may be provided to the wellbore, such as to cool a drill string that is utilized to drill the wellbore and/or to convey cuttings from the wellbore. A lost circulation event occurs when a significant quantity of drilling mud is lost, or flows, from the wellbore and into the subterranean formation. As an example, the wellbore may penetrate a porous region of the subterranean formation, thereby facilitating flow of the drilling mud into the porous region of the subterranean formation. As another example, the drilling operation may fracture the subterranean formation, thereby facilitating flow of the drilling mud into fractures formed within the subterranean formation.

The historical response to lost circulation events has been to install one or more casing strings within the wellbore. While casing string installation may be effective at mitigating the lost circulation events, it may be time-consuming and costly. In addition, a length of the casing string that extends in contact with the subterranean formation may be limited by frictional forces between the casing string and the subterranean formation. Thus, and in order to respond to a subsequent lost circulation event, it may be necessary to install a smaller casing string within an existing casing string. However, this process only may be repeated a limited number of times, as each successive casing string must have a smaller outer diameter than an inner diameter of all prior casing strings; and an overall length and/or depth of the wellbore may be limited by the casing string installation. Thus, there exists a need for improved methods of mitigating lost circulation while drilling a wellbore.

SUMMARY OF THE DISCLOSURE

Methods of mitigating lost circulation while drilling a wellbore. The methods include circulating a drilling mud to a downhole end of the wellbore via a drill string and, during the circulating, drilling the wellbore with a drill bit of the drill string. The methods also include detecting lost circulation within the wellbore while drilling the wellbore and include providing a monomer solution to the wellbore. The methods further include providing a catalyst to the wellbore responsive to detecting the lost circulation event and combining the monomer solution and the catalyst to polymerize a monomer from the monomer solution, within the wellbore, and forming a viscous plug within the wellbore. Subsequent to the combining, the methods include flowing at least a portion of the viscous plug within the wellbore and into a zone of lost circulation that extends within a subsurface region. The methods further include at least partially occluding fluid flow from the wellbore and into the zone of lost circulation with the viscous plug.

DETAILED DESCRIPTION AND BEST MODE OF THE DISCLOSURE

Figure 1:
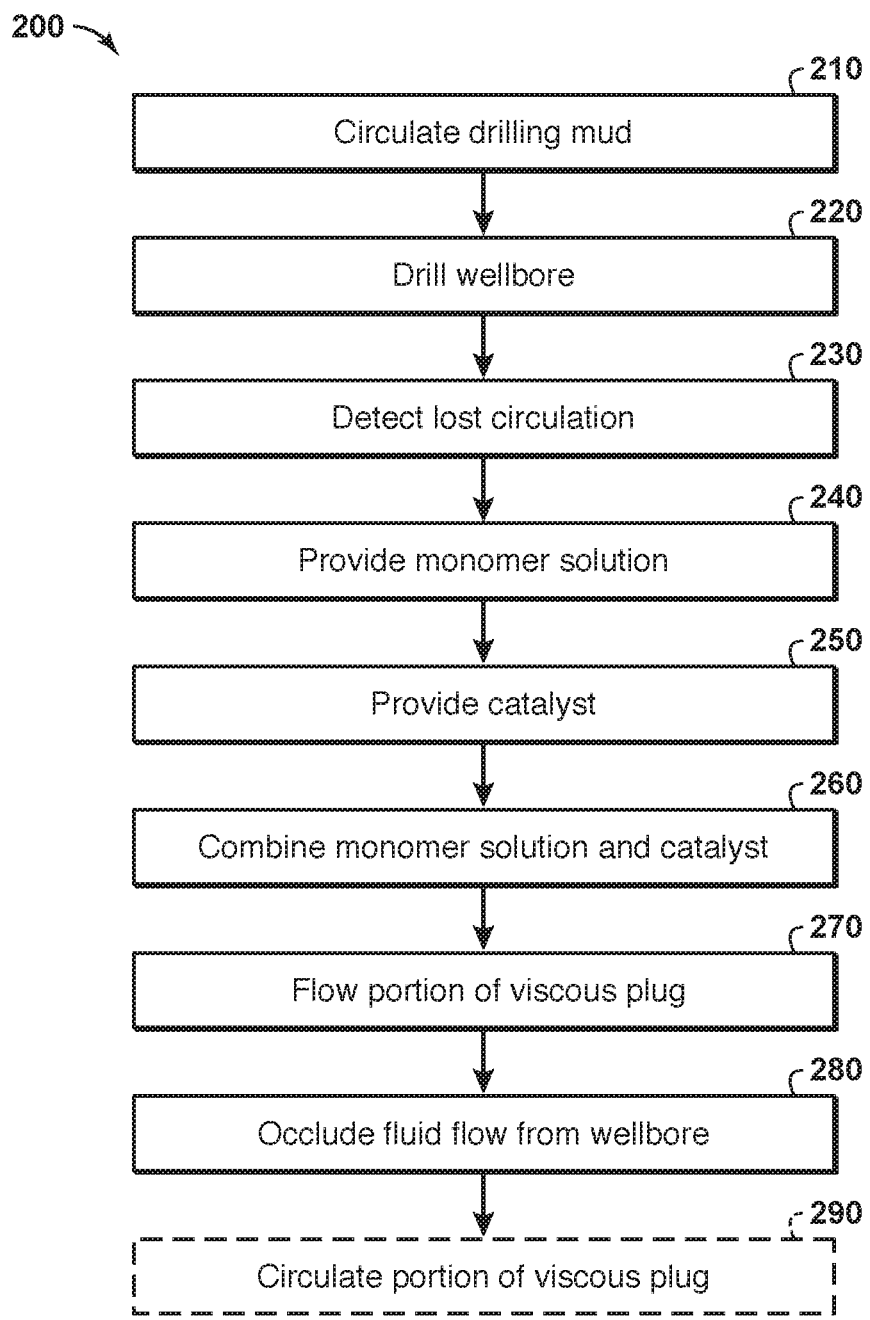
FIG. 1 is a flowchart depicting methods, according to the present disclosure, of mitigating lost circulation while drilling a wellbore.

FIGS. 1-5 provide examples of methods 200, according to the present disclosure, and/or of wells 10 being drilled utilizing methods 200. Elements that serve a similar, or at least substantially similar, purpose are labeled with like numbers in each of FIGS. 1-5, and these elements may not be discussed in detail herein with reference to each of FIGS. 1-5. Similarly, all elements may not be labeled in each of FIGS. 1-5, but reference numerals associated therewith may be utilized herein for consistency. Elements, components, and/or features that are discussed herein with reference to one or more of FIGS. 1-5 may be included in and/or utilized with any of FIGS. 1-5 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

Figure 2:
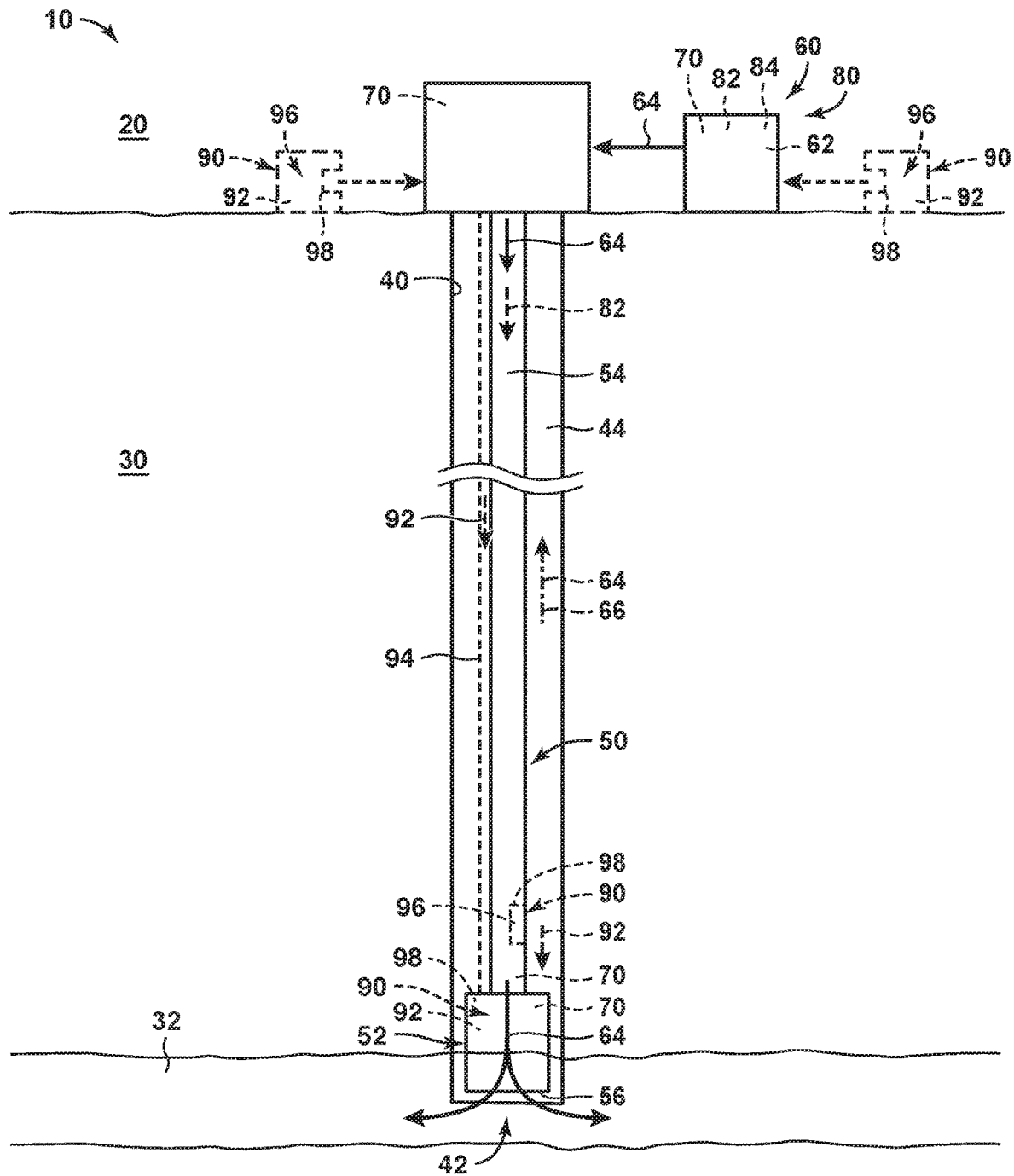
FIG. 2 is a schematic cross-sectional view illustrating examples of a well being drilled utilizing the methods of FIG. 1.
Figure 3:
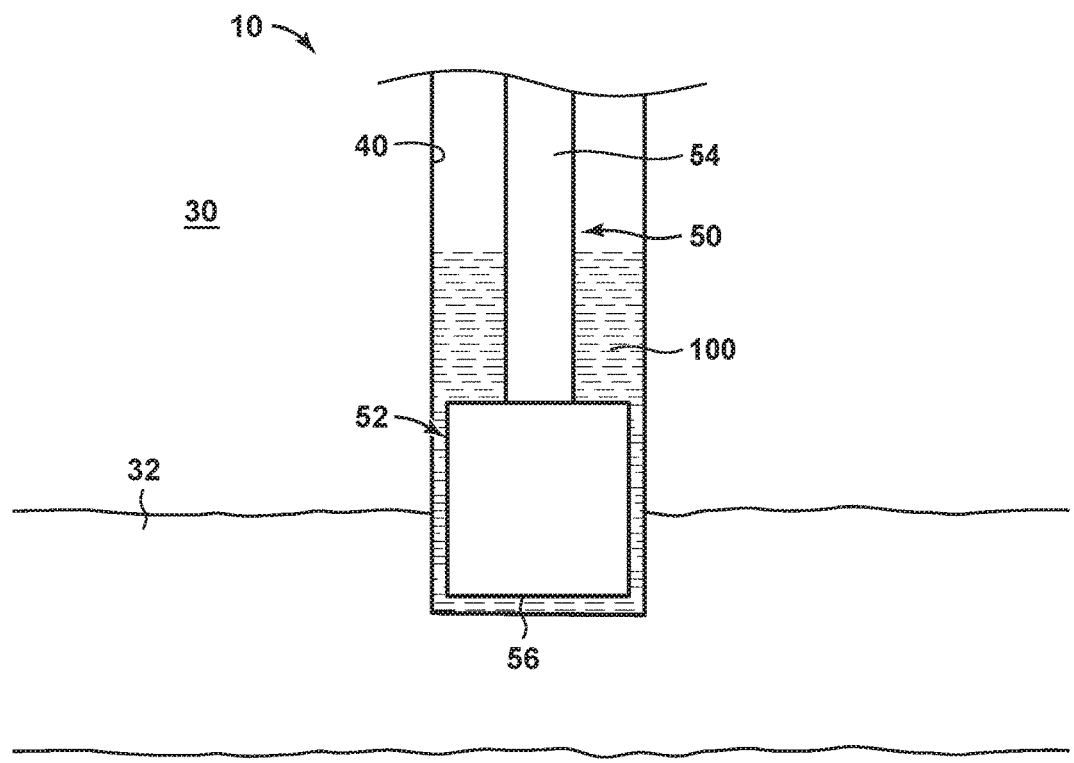
FIG. 3 is a schematic cross-sectional view of the well of FIG. 2 illustrating a portion of the methods of FIG. 1.
Figure 4:
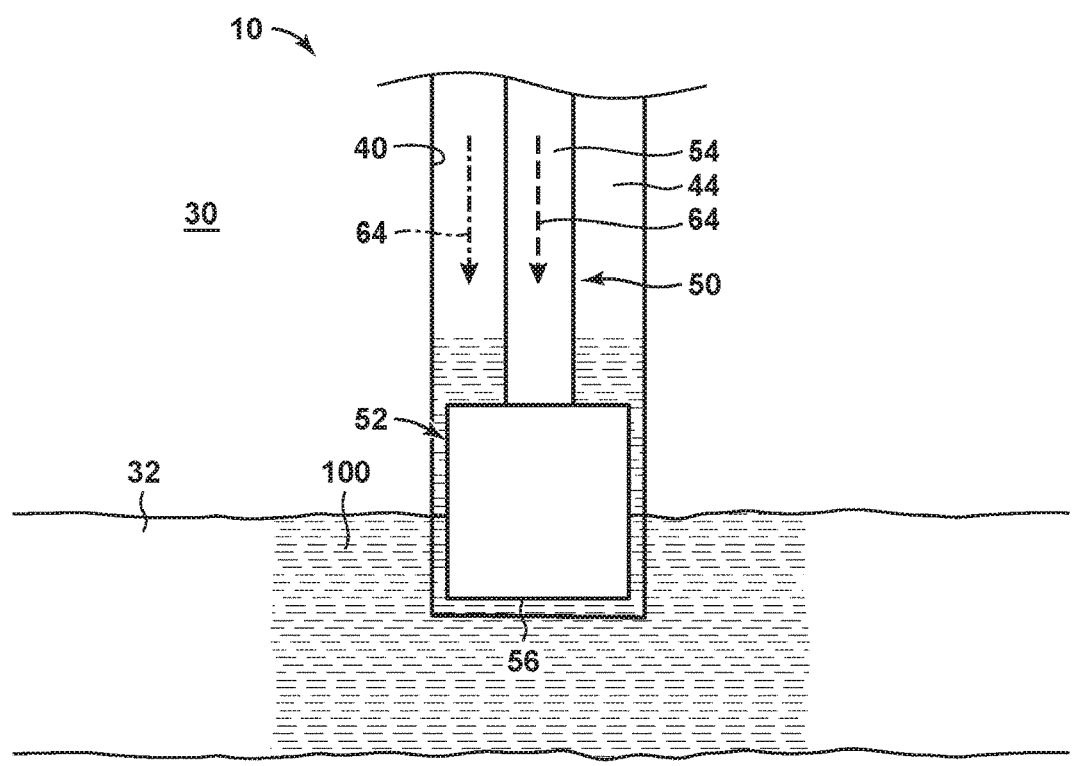
FIG. 4 is a schematic cross-sectional view of the well of FIG. 2 illustrating a portion of the methods of FIG. 1.
Figure 5:
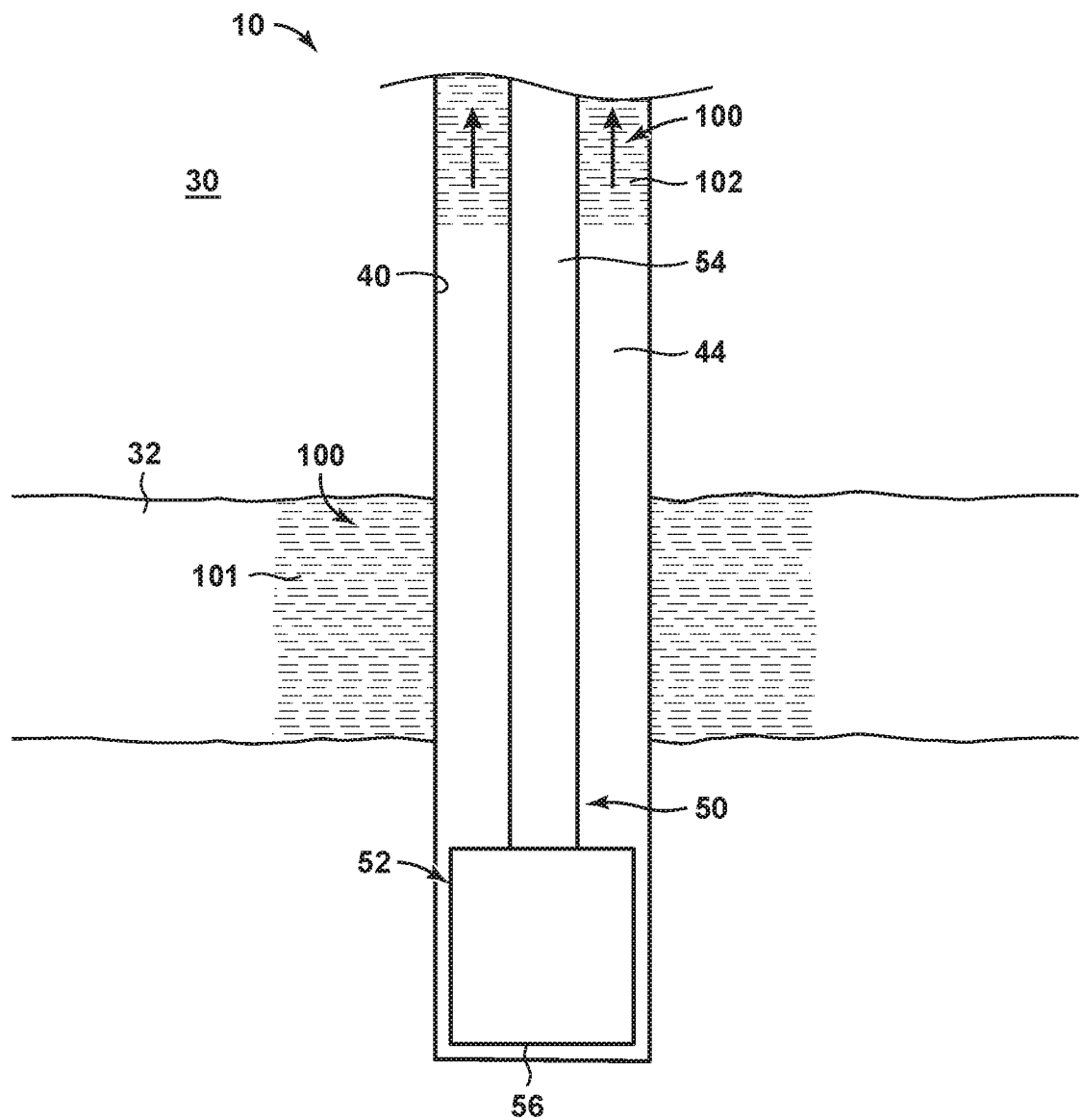
FIG. 5 is a schematic cross-sectional view of the well of FIG. 2 illustrating a portion of the methods of FIG. 1.

FIG. 1 is a flowchart depicting methods 200, according to the present disclosure, of mitigating lost circulation while drilling a wellbore. FIG. 2 is a schematic cross-sectional view illustrating examples of a well being drilled utilizing the methods 200 of FIG. 1, while FIGS. 3-5 are schematic cross-sectional views of the well of FIG. 2 illustrating portions of the methods of FIG. 1.

As illustrated in FIG. 1, methods 200 include circulating a drilling mud at 210, drilling a wellbore at 220, and detecting lost circulation at 230. Methods 200 also include providing a monomer solution at 240, providing a catalyst at 250, and combining the monomer solution and the catalyst at 260. Methods 200 further include flowing a portion of a viscous plug at 270 and occluding fluid flow from the wellbore at 280. Methods 200 also may include circulating a portion of the viscous plug at 290.

In general, and as illustrated in FIG. 2, methods 200 of FIG. 1 may be utilized to drill a well 10 and/or a wellbore 40 thereof. Well 10 also may be referred to herein as, and/or may be, a hydrocarbon well 10 and may extend within a subsurface region 30. Well 10 and/or wellbore 40 thereof additionally or alternatively may be referred to herein as extending between a surface region 20 and the subsurface region. Well 10 may be drilled utilizing a drill string 50 that extends within wellbore 40 and includes a bottom hole assembly 52 including a drill bit 56.

During drilling of wellbore 40, drill string 50, including drill bit 56 thereof, may be rotated within the wellbore. In addition, drilling mud 64 may be provided to a terminal, or downhole, end 42 of wellbore 40 via a drill string conduit 54. The drilling mud may lubricate and/or cool drill bit 56 and may flow to surface region 20 via an annular space 44 that may be defined between drill string 50 and wellbore 40, as illustrated in dash-dot lines in FIG. 2. In addition, the drilling mud also may convey cuttings 66, which may be produced by drill bit 56, to the surface region via the annular space.

During drilling of wellbore 40, the wellbore may penetrate and/or extend into a zone of lost circulation 32. The zone of lost circulation may be porous, may have a greater porosity than a remainder of subsurface region 30 that defines wellbore 40, and/or may permit drilling mud 64 to flow away from and/or out of wellbore 40. This loss of drilling mud 64 may be referred to herein as lost circulation and/or as a lost circulation event.

Upon detection of the lost circulation event, a monomer solution 82 and a catalyst 92, which are illustrated in FIG. 2, may be polymerized within wellbore 40 to produce and/or generate a viscous plug 100, which is illustrated in FIGS. 3-5. Viscous plug 100 may form within wellbore 40 and external to drill string 50, as illustrated in FIG. 3. At least a first portion of the viscous plug may flow into zone of lost circulation 32, thereby at least partially occluding fluid flow from the wellbore and into the zone of lost circulation. Subsequently, and as illustrated in FIG. 5, the drilling operation may be continued, thereby increasing a length of wellbore 40 while preventing loss of drilling mud into the zone of lost circulation via the presence of the first portion of the viscous plug within the zone of lost circulation. As such, methods 200 that are disclosed herein may permit and/or facilitate continued drilling of wellbore 40 without installation of a casing, or a casing string, within wellbore 40 to limit fluid flow into the zone of lost circulation.

Returning to FIG. 1, circulating the drilling mud at 210 may include circulating the drilling mud to the downhole, or terminal, end of the wellbore via the drill string. The drill string may extend within the wellbore. This may include continuously, or at least substantially continuously, circulating the drilling mud during the drilling at 220, during the detecting at 230, during the providing at 240, during the providing at 250, during the combining at 260, during the flowing at 270, during the occluding at 280, and/or during the circulating at 290, which are discussed in more detail herein. Additionally or alternatively, the circulating at 210 may include circulating to provide a motive force for the flowing at 280, and/or for the circulating at 290.

As discussed, the circulating at 210 is illustrated in FIG. 2, with drill string 50 providing drilling mud 64 to terminal end 42 of wellbore 40 via drill string 50. In addition, and as illustrated in FIG. 2, a drilling mud supply system 60 may supply drilling mud 64 to drill string 50. Drilling mud supply system 60 may include a drilling mud tank 62 that contains drilling mud 64 prior to the drilling mud being provided to the drill string.

Drilling the wellbore at 220 may include drilling the wellbore with a drill bit of the drill string. This may include performing the drilling at 220 within the wellbore during, concurrently with, and/or at least partially concurrently with, the circulating at 210. The drilling at 220 may include increasing a length of the wellbore and/or increasing a depth of the well. Additionally or alternatively, the drilling at 220 may include rotating the drill bit within the wellbore to generate cuttings within the wellbore. Under these conditions, methods 200 further may include conveying the cuttings, within the drilling mud, to the surface region via the annular space that extends between the drill string and the wellbore. As discussed, the drilling at 220 is illustrated in FIG. 2, with drill bit 56 being rotated within wellbore 40 to generate cuttings 66, which may be conveyed to surface region 20 within drilling mud 64 via annular space 44.

Detecting lost circulation at 230 may include detecting lost circulation, or the lost circulation event, within the wellbore. The detecting at 230 may be performed during, concurrently with, and/or at least partially concurrently with, the drilling at 220.

It is within the scope of the present disclosure that the detecting at 230 may include detecting any suitable variable and/or condition that may be a result of, and/or that may be indicative of, lost circulation within the wellbore. As examples, the detecting at 230 may include detecting one or more of a pressure change within the wellbore, a pressure drop, or decrease, within the wellbore, a change in a flow rate of drilling mud, an increase in the flow rate of drilling mud, and/or a change in a temperature within the wellbore. As additional examples, the detecting at 230 may include detecting one or more of a loss of drilling mud, a decrease in a level of drilling mud within the drilling mud tank that provides the drilling mud to the wellbore, and/or detecting a decrease in cuttings being conveyed from the wellbore in the drilling mud.

The detecting at 230 also may include detecting in any suitable manner. As an example, the detecting at 230 may include visually detecting lost circulation, such as by an operator of a drilling rig that performs the drilling at 220. As another example, the detecting at 230 may include detecting with a sensor, such as sensor 70 that is illustrated in FIG. 2. As illustrated in FIG. 2, the sensor may be present in surface region 20 and/or in subsurface region 30. Additionally or alternatively, the sensor may form a portion of drill string 50 and/or of bottom hole assembly 52.

Providing the monomer solution at 240 may include providing the monomer solution to the wellbore. This may include providing the monomer solution in any suitable manner. As an example, the providing at 240 may include providing a mixture, or solution, of the monomer and the drilling mud. This may include circulating the mixture of drilling mud and monomer to the downhole end of the wellbore via the drill string. When the providing at 240 includes providing the mixture of the drilling mud and the monomer, it is within the scope of the present disclosure that the providing at 240 further may include providing the mixture at least partially concurrently with the circulating at 210, during at least a portion of the circulating at 210, and/or during an entirety of the circulating at 210. Stated another way, and as illustrated in FIG. 2, a monomer solution supply system 80 may provide monomer solution 82, including a monomer 84 thereof, to terminal end 42 of wellbore 40 via and/or utilizing drill string 50 and/or drill string conduit 54 thereof.

The providing at 240 also may include providing the monomer solution with any suitable timing during methods 200. As examples, the providing at 240 may include providing the monomer solution prior to the detecting at 230, during the drilling at 220, and/or during an entirety of the drilling at 220. Under these conditions, methods 200 may include performing the providing at 240 concurrently with, or during an entirety of, the circulating at 210, such as via mixing of the monomer and the drilling mud within the drilling mud tank prior to and/or during the circulating at 210.

As another example, the providing at 240 may include providing the monomer solution responsive to the detecting at 230. Under these conditions, the providing at 240 may be initiated, such as via mixing the monomer into the drilling mud within the surface region and/or in the drilling mud tank, subsequent to and/or based upon detecting the lost circulation event during the detecting at 230.

It is within the scope of the present disclosure that the monomer solution may include any suitable monomer and/or may have any suitable physical and/or chemical property and/or properties. As an example, the monomer solution may include any suitable monomer solution that will polymerize and/or that will form the viscous plug within wellbore 40 responsive to combining with the catalyst, such as during the combining at 260. This may include any suitable monomer solution that will form the viscous plug within the wellbore, within the wellbore fluid, and/or within a downhole environment that is present within the wellbore. Examples of the monomer solution include monomer solutions that include, that consist of, and/or that consist essentially of one or more of dicyclopentadiene, norborene, and/or a ring-opening metathesis-compatible monomer. As used herein, the phrase "ring-opening metathesis-compatible monomer" may include any suitable monomer that participates in, or that is configured to participate in, a ring-opening metathesis reaction responsive to chemical contact with a corresponding catalyst, examples of which are disclosed herein.

The providing at 240 may include providing the monomer solution with any suitable monomer concentration. As an example, and when the providing at 240 includes providing the mixture of the monomer and drilling mud, the providing at 240 further may include providing the mixture with a monomer concentration of at least 1 volume percent (vol %), at least 2 vol %, at least 4 vol %, at least 10 vol %, at least 15 vol %, at least 20 vol %, at least 25 vol %, at least 30 vol %, at least 40 vol %, at least 50 vol %, at most 99 vol %, at most 95 vol %, at most 90 vol %, at most 80 vol %, at most 70 vol %, at most 60 vol %, at most 50 vol %, at most 40 vol %, at most 30 vol %, at most 20 vol %, at most 15 vol %, at most 10 vol %, and/or at most 5 vol %. In general, the monomer concentration may be selected to provide a desired degree of polymerization and/or viscosity of the viscous plug formed during the combining at 260.

The providing at 240 also may include providing the monomer solution with any suitable monomer solution viscosity. As examples, the monomer solution viscosity may be at least 0.75, at least 1.0, at least 2, at least 5, at least 10, at least 20, at least 30, at least 40, at least 50, at least 75, at least 100, at least 250, at least 500, at least 750, at most 1000, at most 900, at most 800, at most 700, at most 600, at most 500, at most 400, at most 300, at most 200, and/or at most 100 times a viscosity of water.

The providing at 240 additionally or alternatively may include providing the monomer solution with any suitable density. As examples, the density of the monomer solution may be at least 0.5, at least 1, at least 1.5, at most 4, at most 3, at most 2, and/or at most 1.5 times a density of the drilling mud. As more specific examples, the monomer solution may have a density of at least 1400 kilograms per cubic meter, at least 1600 kilograms per cubic meter, at least 1800 kilograms per cubic meter, at least 2000 kilograms per cubic meter, at least 2500 kilograms per cubic meter, at most 3000 kilograms per cubic meter, at most 2500 kilograms per cubic meter, and/or at most 1500 kilograms per cubic meter.

The monomer solution and/or the monomer thereof may be selected to be stable, at least substantially stable, non-reactive, and/or at least substantially non-reactive, within the wellbore. As examples, and absent contact with the catalyst, less than a threshold fraction of the monomer solution may react at temperatures, at pressures, and/or under environmental conditions present within the wellbore. Examples of the threshold fraction include fractions of less than 10 vol %, less than 8 vol %, less than 6 vol %, less than 4 vol %, less than 2 vol %, less than 1 vol %, and/or less than 0.5 vol %. Examples of the temperatures present within the wellbore include temperatures of at least 0 degrees Celsius (° C.), at least 25° C., at least 50° C., at least 100° C., at least 150° C., at least 200° C., at most 300° C., at most 250° C., at most 200° C., at most 150° C., and/or at most 100° C.

When the providing at 240 includes providing the mixture of the monomer and the drilling mud, the monomer may be selected to be at least partially soluble in the drilling mud. As an example, the monomer may be selected to be miscible with the drilling mud. As another example, the monomer may be selected to be soluble, within the drilling mud, at a monomer concentration at which the monomer solution is provided to the wellbore. Examples of the monomer concentration are disclosed herein.

Providing the catalyst at 250 may include providing the catalyst to the wellbore. This may include providing the catalyst responsive to the detecting at 230, providing the catalyst such that the combining at 260 occurs within the wellbore, and/or providing the catalyst such that the monomer polymerizes within the wellbore and forms the viscous plug within the wellbore.

The providing at 250 may include providing the catalyst in any suitable manner. As an example, the providing at 250 may include releasing the catalyst within the wellbore such that the combining at 260 occurs external to the drill string. As another example, and as illustrated in FIG. 2, the providing at 250 may include releasing with, via, and/or utilizing a catalyst supply system 90 and/or one or more components thereof. As an example, the catalyst release system may include a catalyst reservoir 96 that includes catalyst 92 and extends within and/or forms a portion of drill string 50. Under these conditions, the providing at 250 may include releasing the catalyst from the catalyst reservoir. As another example, the catalyst supply system may include a catalyst release valve 98, and the providing at 250 may include opening the catalyst release valve to release the catalyst from the catalyst release reservoir.

As yet another example, the providing at 250 may include releasing the catalyst from a sub, or section, of the drill string. As another example, the providing at 250 may include releasing the catalyst from and/or via a catalyst conduit, such as catalyst conduit 94 of FIG. 2, that extends along the drill string from the surface region. Under these conditions, catalyst reservoir 96 and/or catalyst release valve 98 may be positioned within the surface region, as illustrated in FIG. 2. As yet another example, the providing at 250 may include releasing the catalyst in the surface region, such as by releasing the catalyst into the drilling mud tank. Under these conditions, the combining at 260 may occur within the surface region, and the catalyst and/or the monomer may be selected such that less than a threshold fraction of the monomer polymerizes prior to the monomer solution exiting the drill string and entering the wellbore. Examples of the threshold fraction of the monomer include threshold fractions of less than 10 vol %, less than 8 vol %, less than 6 vol %, less than 5 vol %, less than 4 vol %, less than 3 vol %, less than 2 vol %, less than 1 vol %, less than 0.5 vol %, less than 0.1 vol %, and/or less than 0.01 vol %.

The providing at 250 may be performed in any suitable manner. As an example, the providing at 250 may be performed manually, such as by the operator of the drilling rig that performs the drilling at 220. As another example, the providing at 250 may be automatic and/or automated. As a more specific example, and responsive to the detecting at 230, methods 200 may include providing a lost circulation signal to a controller and/or receiving the lost circulation signal with the controller. Responsive to receipt of the lost circulation signal, the controller may generate a catalyst release signal, which may be provided to the catalyst release valve. Responsive to receipt of the catalyst release signal, the catalyst release valve may open, thereby releasing the catalyst into the wellbore.

The catalyst may include any suitable catalyst that may initiate reaction of the monomer solution, or of the monomer, to produce and/or generate the viscous plug within the wellbore, such as during the combining at 260. Examples of the catalyst include one or more of a transition metal catalyst, a transition metal carbene complex catalyst, a ruthenium catalyst, a ruthenium trichloride-based catalyst, a ring-opening metathesis-inducing catalyst, and/or a Grubb's catalyst.

It is within the scope of the present disclosure that the providing at 250 may include providing a volume of catalyst and that the providing at 240 may include providing a volume of monomer. Under these conditions, the volume of catalyst may be less than a threshold fraction of the volume of monomer. Examples of the threshold fraction include at least 0.5 percent, at least 1 percent, at least 1.5 percent, at least 2 percent, at most 5 percent, at most 4 percent, at most 3 percent, at most 2.5 percent, at most 2 percent, at most 1.5 percent, and/or at most 1 percent of the volume of monomer.

Combining the monomer solution and the catalyst at 260 may include combining to polymerize the monomer within the wellbore and/or to form the viscous plug within the wellbore. This may include combining external to the drill string, combining such that the monomer polymerizes external to the drill string, and/or combining such that less than the threshold fraction of the monomer polymerizes prior to the monomer exiting the drill string. This is illustrated in FIG. 3, with viscous plug 100 extending external drill string 50 and within wellbore 40.

The viscous plug generally will have an increased viscosity relative to the drilling mud and/or relative to the monomer solution. Stated another way, the combining at 260 may include increasing the viscosity of the monomer solution and/or of the drilling mud via formation of the viscous plug. As examples, the viscosity may increase by a factor of at least 1.1, at least 2, at least 5, at least 10, at least 25, at least 50, at least 100, at least 250, at least 500, at most 50,000, at most 40,000, at most 30,000, at most 20,000, at most 10,000, at most 5,000, at most 1000, at most 750, at most 500, at most 250, and/or at most 100. As more specific examples, the viscosity may increase to at least 1.1 centipoise (cP), at least 2 cP, at least 5 cP, at least 10 cP, at least 25 cP, at least 50 cP, at least 100 cP, at least 250 cP, at least 500 cP, at most 50,000 cP, at most 40,000 cP, at most 30,000 cP, at most 20,000 cP, at most 10,000 cP, at most 5,000 cP, at most 1000 cP, at most 750 cP, at most 500 cP, at most 240 cP, and/or at most 100 cP.

The increase in viscosity may be accomplished in any suitable manner. As an example, the combining at 260 may include forming a plurality of polymerized microsolids within the monomer solution, and the formation of the microsolids may increase the viscosity.

Methods 200 and/or the combining at 260 generally are referred to herein as forming a viscous plug within the wellbore. In general, and as discussed herein, this viscous plug may have and/or exhibit an increased viscosity when compared to the drilling mud and/or to the monomer solution. However, this viscous plug generally is not a solid and/or does not exhibit viscoelasticity, at least not over macroscopic length scales, examples of which include length scales of greater than 0.1 millimeter (mm), greater than 1 mm, greater than 5 mm, and/or greater than 10 mm.

That said, it also is within the scope of the present disclosure that the combining at 260 instead may include formation of a solid, or of a viscoelastic solid, plug within the wellbore. Under these conditions, methods 200 further include maintaining rotation of the drill string during formation of the solid plug and/or retracting the drill string from the terminal end of the wellbore during formation of the solid plug, such as to avoid the drill string becoming stuck within the solid plug subsequent to formation of the solid plug. Subsequent to formation of the solid plug, the drill string then may be utilized to drill through a portion of the solid plug that remains within the wellbore.

Flowing the portion of the viscous plug at 270 may include flowing at least the portion, or at least a first portion, of the viscous plug through the wellbore and into the zone of lost circulation. This is illustrated by the transition from FIG. 3 to FIG. 4. In FIG. 3, viscous plug 100 is within wellbore 40 and external to drill string 50. Subsequently, and as illustrated in FIG. 5, viscous plug 100 has flowed into zone of lost circulation 32.

The flowing at 270 may be accomplished in any suitable manner. As an example, and as illustrated in dashed lines in FIG. 4, the flowing at 270 may be facilitated by providing a fluid, such as drilling mud 64, to wellbore 40 via drill string conduit 54. As another example, and as illustrated in dash-dot lines in FIG. 4, the flowing at 270 may be facilitated by flowing the fluid within annular space 44 and/or toward terminal end 42 of wellbore 40.

Occluding fluid flow from the wellbore at 280 may include at least partially occluding fluid flow from the wellbore and into the zone of lost circulation. This may include occluding the fluid flow with, via, and/or utilizing the viscous plug. As discussed, the viscous plug may have a viscosity that is significantly higher than the viscosities of the drilling mud and/or of the monomer solution. As such, the presence of the viscous plug within the zone of lost circulation, as illustrated in FIG. 4, may block, restrict, and/or occlude fluid flow from the wellbore and into the zone of lost circulation, thereby mitigating, or ceasing, the lost circulation event.

As discussed, the occluding at 280 may include occluding the fluid flow without installing a casing within the wellbore to limit fluid flow from the wellbore and into the zone of lost circulation. The occluding at 280 additionally or alternatively may include occluding the fluid flow without forming a solid plug within the wellbore and/or without forming a macroscopic viscoelastic body within the wellbore.

Circulating the portion of the viscous plug at 290 may include circulating a second portion of the viscous plug from the subterranean formation via the annular space. This may include removing the second portion of the viscous plug, or a portion of the viscous plug that does not enter the zone of lost circulation, from the wellbore, such as to permit and/or facilitate subsequent fluid flow within the wellbore and/or within the annular space. The circulating at 290 is illustrated in FIG. 5. As illustrated therein, first portion 101 of viscous plug 100 remains within zone of lost circulation 32, while second portion 102 of the viscous plug is circulated from wellbore 40 via annular space 44. FIG. 5 also illustrates that, subsequent to the occluding at 280, methods 200 may include continuing the drilling at 220 to increase the length of the wellbore.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The methods disclosed herein are applicable to the well drilling industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of mitigating lost circulation while drilling a wellbore within a subsurface region of a subterranean formation, the method comprising:
   circulating a drilling mud to a downhole end of the wellbore via a drill string;
   during the circulating the drilling mud, drilling the wellbore with a drill bit of the drill string;
   during the drilling the wellbore, detecting lost circulation within the wellbore;
   providing a monomer solution to the wellbore;
   responsive to the detecting lost circulation, providing a catalyst to the wellbore;
   combining the monomer solution and the catalyst to polymerize a monomer from the monomer solution within the wellbore and to form a viscous plug within the wellbore;
   subsequent to the combining, flowing at least a portion of the viscous plug, within the wellbore, into a zone of lost circulation that extends within the subsurface region; and
   at least partially occluding fluid flow from the wellbore into the zone of lost circulation with the viscous plug; and
   wherein the combining includes increasing a viscosity of the monomer solution by a factor of at least 1.1 and at most 1000.

2. The method of claim 1, wherein the detecting lost circulation includes at least one of:
   (i) detecting a pressure change within the wellbore;
   (ii) detecting a pressure drop within the wellbore;
   (iii) detecting a change in a flow rate of drilling mud;
   (iv) detecting an increase in the flow rate of drilling mud;
   (v) detecting a change in a temperature within the wellbore;
   (vi) detecting a loss of drilling mud;
   (vii) detecting a decrease in a level of drilling mud in a mud tank that provides the drilling mud to the wellbore; and
   (viii) detecting a decrease in cuttings being conveyed from the wellbore in the drilling mud.

3. The method of claim 1, wherein the detecting the lost circulation includes at least one of:
   (i) detecting the lost circulation with a sensor;
   (ii) detecting the lost circulation with a sensor that forms a portion of a bottom hole assembly;
   (iii) detecting the lost circulation with a sensor that is present in a surface region; and
   (iv) visually detecting the lost circulation.

4. The method of claim 1, wherein the providing the monomer solution includes providing a mixture of the monomer and the drilling mud.

5. The method of claim 1, wherein the providing the monomer solution includes providing at least one of dicyclopentadiene, norborene, and a ring-opening metathesis-compatible monomer.

6. The method of claim 1, wherein, in the absence of the catalyst, the monomer solution is at least substantially non-reactive at temperature, pressure, and environmental conditions present within the wellbore.

7. The method of claim 1, wherein the monomer is at least one of:
   (i) miscible in the drilling mud; and
   (ii) soluble in the drilling mud at a monomer concentration at which the monomer solution is provided to the wellbore.

8. The method of claim 1, wherein the catalyst is at least one of:
   (i) a transition metal catalyst;
   (ii) a transition metal carbene complex catalyst;
   (iii) a ruthenium catalyst;
   (iv) a ruthenium trichloride-based catalyst;
   (v) a ring-opening metathesis-inducing catalyst; and
   (vi) a Grubb's catalyst.

9. The method of claim 1, wherein the providing the catalyst includes providing a volume of catalyst, wherein the providing the monomer solution includes providing a volume of monomer, and further wherein the volume of catalyst is at least 1 and at most 2 percent of the volume of monomer.

10. The method of claim 1, wherein the providing the monomer solution includes circulating a solution of drilling mud and monomer to the downhole end of the wellbore via the drill string at least one of:
    (i) during at least a portion of the circulating the drilling mud;
    (ii) during an entirety of the circulating the drilling mud; and
    (iii) at least partially concurrently with the circulating the drilling mud.

11. The method of claim 10, wherein the providing the monomer includes at least one of:
    (i) providing the monomer prior to the detecting lost circulation;
    (ii) providing the monomer during the drilling;
    (iii) providing the monomer during an entirety of the drilling; and
    (iv) providing the monomer responsive to the detecting lost circulation.

12. The method of claim 1, wherein the providing the catalyst includes releasing the catalyst within the wellbore such that the combining occurs external to the drill string.

13. The method of claim 1, wherein the providing the catalyst includes releasing the catalyst from a catalyst reservoir that extends within the drill string.

14. The method of claim 1, wherein the providing the catalyst includes releasing the catalyst from a sub of the drill string.

15. The method of claim 1, wherein the providing the catalyst includes releasing the catalyst from a catalyst conduit that extends along the drill string from a surface region.

16. The method of claim 1, wherein the combining includes combining external to the drill string.

17. The method of claim 1, wherein the combining includes combining within a surface region, flowing a combination of the monomer solution and the catalyst, via the drill string, to a region of the wellbore that is proximate the zone of lost circulation, and releasing the combination of the monomer solution and the catalyst into the wellbore from the drill string, wherein the catalyst and the monomer solution are selected such that at most 5 weight percent of the monomer is polymerized prior to being released from the drill string and into the wellbore.

18. The method of claim 1, wherein the portion of the viscous plug is a first portion of the viscous plug, and further wherein the method includes circulating a second portion of the viscous plug from the subterranean formation via an annular space that extends between the drill string and the wellbore.

19. The method of claim 1, wherein the portion of the viscous plug includes a first portion of the viscous plug within the subsurface region and a second portion of the viscous plug within the wellbore, and further wherein the method includes circulating the second portion of the viscous plug from the wellbore via an annular space that extends between the drill string and the wellbore.

20. The method of claim 1, wherein the method includes continuing the circulating the drilling mud during the drilling, the detecting lost circulation, the providing the monomer solution, the providing the catalyst, the combining, the flowing, and the at least partially occluding.

* * * * *